US 8,832,087 B2

(12) United States Patent
Kawai et al.

(10) Patent No.: US 8,832,087 B2
(45) Date of Patent: Sep. 9, 2014

(54) INFORMATION ESTIMATION DEVICE, INFORMATION ESTIMATION METHOD, AND COMPUTER-READABLE STORAGE MEDIUM

(75) Inventors: Takao Kawai, Tokyo (JP); Shinichi Ando, Tokyo (JP); Satoshi Nakazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 278 days.

(21) Appl. No.: 13/516,937

(22) PCT Filed: Dec. 9, 2010

(86) PCT No.: PCT/JP2010/072082
§ 371 (c)(1),
(2), (4) Date: Jun. 18, 2012

(87) PCT Pub. No.: WO2011/077957
PCT Pub. Date: Jun. 30, 2011

(65) Prior Publication Data
US 2012/0259805 A1 Oct. 11, 2012

(30) Foreign Application Priority Data
Dec. 21, 2009 (JP) ................ 2009-288563

(51) Int. Cl.
*G06F 17/30* (2006.01)
*G06F 17/27* (2006.01)
(52) U.S. Cl.
CPC ........ *G06F 17/277* (2013.01); *G06F 17/30985* (2013.01)
USPC ........................................ 707/723
(58) Field of Classification Search
CPC .................. G06F 17/30861; G06F 17/30867; G06F 17/30985
See application file for complete search history.

(56) References Cited

U.S. PATENT DOCUMENTS

| 6,044,375 A | * | 3/2000 | Shmueli et al. | 1/1 |
| 7,178,099 B2 | * | 2/2007 | Meyer et al. | 715/210 |
| 2009/0319505 A1 | * | 12/2009 | Li et al. | 707/5 |

FOREIGN PATENT DOCUMENTS

| JP | 9-269940 | 10/1997 |
| JP | 2004-240488 | 8/2004 |
| JP | 2005-135198 | 5/2005 |
| JP | 2007-047962 | 2/2007 |
| JP | 2007-141033 | 6/2007 |

OTHER PUBLICATIONS

International Search Report, PCT/JP2010/072082, Jan. 11, 2011.
Nao Okuda et al., "Shinbun Kiji to blog kara no Doko Joho n Chushutsu to Kashika", Proceedings of the 13th annual meeting of the Association for Natural Language Processing, Mar. 19, 2007, pp. 1129 to 1132.

* cited by examiner

*Primary Examiner* — Wilson Lee
*Assistant Examiner* — Loc Tran
(74) *Attorney, Agent, or Firm* — Young & Thompson (57) ABSTRACT

Disclosed is an information estimation device for estimating an appropriate issue time from a time representation described in a document without intervention of any operator; wherein an information estimation device (1) which is a device for estimating an issue time of a document to be estimated, includes a candidate generation unit (11) which extracts a time representation described in the document, and on the basis of the extracted time representation, generates a plurality of possible issue time candidates having possibilities corresponding to the issue time of the document; and an issue time estimation unit (12) for obtaining a temporal proximity, for each of the plurality of issue time candidates, between the issue time candidate and other issue time candidates, and on the basis of the obtained temporal proximity, estimating the issue time of the document.

21 Claims, 8 Drawing Sheets

<Regarding YYY of XXX>

This year's XX is XXX.
··· on Heisei Year 16 Month 11 Day 24···.
···.

xxxx is planned to start on January 14, 2005.
In this connection, ··· in the xxxxx report of November 2004....

2004-11-25
*******************************************
(c) 2004XYZ

URL
http://···.com/···/041125.html

FIG. 5

| ID | Extracted | Y | M | D |
|----|-----------|------|-----|----|
| 1 | Heisei Year 16 Month 11 Day 24 | 2004 | 11 | 24 |
| 2 | January 14, 2005 | 2005 | 1 | 14 |
| 3 | November 2004 | 2004 | 11 | * |
| 4 | 2004-11-25 | 2004 | 11 | 25 |
| 5 | 2004 | 2004 | * | * |
| 6 | 041125 | 2004 | 11 | 25 |

FIG. 6

| ID | Y | M | D | OV_SUM | OV_WGH |
|---|---|---|---|---|---|
| 1 | 1 | 1 | 1 | 3 | 111 |
| 2 | 0 | 0 | 1 | 1 | 100 |
| 3 | 1 | 4 | 0 | 5 | 41 |
| 4, 6 | 1 | 1 | 2 | 4 | 211 |
| 5 | 5 | 0 | 0 | 5 | 5 |

FIG. 7

| ID | 1 | 2 | 3 | 4 | 5 | 6 |
|---|---|---|---|---|---|---|
| 1 |  | 51 | −23 | 1 | −328 | 1 |
| 2 | −51 |  | −74 | −50 | −379 | −50 |
| 3 | 23 | 74 |  | 24 | −305 | 55 |
| 4 | −1 | 50 | −24 |  | −329 | 0 |
| 5 | 328 | 379 | 305 | 329 |  | 329 |
| 6 | −1 | 50 | −24 | 0 | −329 |  |

FIG. 8

| ID | SP_SUM | SP_AVR |
|---|---|---|
| 1 | 404 | 80.8 |
| 2 | 604 | 120.8 |
| 3 | 450 | 90 |
| 4 | 404 | 80.8 |
| 5 | 1670 | 334 |
| 6 | 404 | 80.8 |

US 8,832,087 B2

INFORMATION ESTIMATION DEVICE, INFORMATION ESTIMATION METHOD, AND COMPUTER-READABLE STORAGE MEDIUM

TECHNICAL FIELD

The present invention relates to an information estimation device, an information estimation method, and a computer-readable storage medium having recorded thereon a software program for implementing the same, and in particular, relates to a technology for associating metadata with documents.

BACKGROUND ART

Additional information regarding a document is commonly referred to as document "metadata (bibliographic information)." For example, it may include information such as the time of issue, title, author, category, and the like. In particular, the time of issue included in such metadata is temporal information that indicates when the information obtained from the document was issued. The time of issue is important in identifying the novelty of the information obtained from the document.

However, issue time-related metadata is not necessarily associated with all documents and there are numerous documents with unclear metadata. In order to manually determine the time of issue of a document whose metadata description format and schema have not been ascertained, it is usually necessary to get the requisite information from the document and determine whether or not it is the time of issue.

In other words, manual determination of the information that corresponds to the time of issue in a document having no associated metadata is equivalent to getting the requisite information from a document containing diverse representation formats. In addition, even if numerous items of time information can be found, it is difficult to identify the time of issue from the found time information. As a result, the problem of cost arises when one attempts to manually determine the time of issue.

Here, documents published on the Internet or Intranet are used as an example to describe how the time of issue of such documents is identified. Documents published on the Internet or Intranet contain diverse representation formats and metadata is not necessarily associated with such documents in accordance with pre-defined formats and schemas. It should be noted that while the RDF (Resource Description Framework), a standard introduced by the W3C, is known as an example of a metadata definition for such documents, it is believed that not all documents have information associated therewith in accordance with the RDF and there are more documents that have no associated information.

In addition, documents published on the Internet or Intranet are in many cases written in HTML (Hyper Text Markup Language) format. In general, the HTML format excels at representing the structure and appearance of documents and, in documents written in HTML format, the level of freedom in representation is increased. For this reason, HTML documents are written using variegated representation formats.

Therefore, in case of a document written in HTML format, in order to determine information regarding when, and who, issued what type of document, the requisite information has to be found by interpreting diverse representation formats. Accordingly, for a document written in HTML format, it is difficult to manually determine the information that corresponds to the time of issue, which creates the above-described cost problem.

On the other hand, as an alternative, it is contemplated to collect documents published on the Internet or Intranet and use the time of collection as the time of issue. However, while this technique does simplify the determination of the time of issue, it cannot ensure that all documents can be collected without delay at the point in time when they are issued. In addition, the above-described problems are difficult to eliminate because the documents have to be collected quickly and in large quantities, thereby increasing the associated costs.

In addition, it is also contemplated to use time information, such as the Last-Modified header and the like, which is returned by Web servers in response during communication via HTTP, as the time of issue. However, since in many cases Web servers return inaccurate time and sometimes these headers are not even attached, numerous problems arise when this type of time information is used as the time of issue of a document.

Against this background, for example, Patent Document 1 has disclosed a method for estimating the time of issue from time representations contained in a document. In the method disclosed in Patent Document 1, first of all, time representations are extracted using rules describing in advance the patterns of time representation contained in the document, and the rule with the largest number of extractions is identified. The date and time of issue represented by the time representation extracted based on the identified rule are then estimated to be the time of issue.

CITATION LIST

Patent Document

Patent Document 1: JP 2005-135198A

DISCLOSURE OF THE INVENTION

Problem to be Solved by the Invention

The method disclosed in Patent Document 1 is believed to be capable of efficiently and automatically estimating the time of issue and reducing estimation-related costs. However, in the method disclosed in Patent Document 1, there is a chance that, after all, the time of issue may be inaccurate because the time of issue is estimated based on the most frequently extracted time representations utilizing the same notation. The reasons for that are described below.

Document usually contain a plurality of time representations of various granularity levels, such as Year, Year/Month, Year/Month/Day, Month/Day, Day, Time, and the like recorded in diverse formats. In addition, these time representations also include representations related to the events etc. described in the documents without any connection to the time of issue of the documents. For example, documents contain various time representations, such as the dates and times of news article publication, the dates and times of recent events, the dates of past events, as well as the dates and plans for future events. In other words, it is believed that the likelihood that time representations utilizing the same notation that are most frequently extracted from a document will correspond to the time of issue of the document is not high.

On the other hand, in view of the fact that a date appearing first in a document is quite likely to represent the time of issue, a method is also contemplated, in which a time representation that appears first among the time representations contained in a document is identified and the date represented by this time representation is used as the time of issue. However, there is a chance that a time representation appearing in the middle or at the end of a document may represent the time of issue and the time of issue may be inaccurate if the time of issue is identified based solely on the location in which the time representation appears.

For this reason, currently there is demand for techniques for appropriately estimating time representations corresponding to the time of issue of a document among the plurality of time representations present in the document without operator intervention.

It is an object of the present invention to eliminate the above-described problems and provide an information estimation device, an information estimation method, and a computer-readable storage medium that allow for an appropriate estimate of the time of issue to be provided without operator intervention based on the time representations described in a document.

Means for Solving the Problem

In order to attain the above-described object, the information estimation device of the present invention is designed as an information estimation device that estimates the time of issue of a document to be estimated, comprising:

a candidate generation unit that extracts time representations described in the document to be estimated, and generates a plurality of issue time candidates potentially corresponding to the time of issue of the document to be estimated based on the extracted time representations; and an issue time estimation unit that obtains temporal proximities between a given issue time candidate and other issue time candidates for each of the plurality of issue time candidates, and estimates the time of issue of the document to be estimated based on the obtained temporal proximities.

In addition, in order to attain the above-described object, the information estimation method of the present invention is a method for estimating the time of issue of a document to be estimated, the method comprising the steps of:

(a) extracting time representations described in the document to be estimated, and generating a plurality of issue time candidates potentially corresponding to the time of issue of the document to be estimated based on the extracted time representations; and (b) obtaining temporal proximities between a given issue time candidate and other issue time candidates for each of the plurality of issue time candidates, and estimating the time of issue of the document to be estimated based on the obtained temporal proximities.

Furthermore, in order to attain the above-described object, the computer-readable storage medium of the present invention is a computer-readable storage medium having recorded thereon a software program for estimating the time of issue of a document to be estimated using a computer, the software program comprising instructions directing a computer to execute the steps of:

(a) extracting time representations described in the document to be estimated, and generating a plurality of issue time candidates potentially corresponding to the time of issue of the document to be estimated based on the extracted time representations; and (b) obtaining temporal proximities between a given issue time candidate and other issue time candidates for each of the plurality of issue time candidates, and estimating the time of issue of the document to be estimated based on the obtained temporal proximities.

Effects of the Invention

As described above, the information estimation device, information estimation method, and computer-readable storage medium of the present invention allow for an appropriate estimate of the time of issue to be provided without operator intervention based on the time representations described in a document.

BEST MODE FOR CARRYING OUT THE INVENTION (Embodiments)

Figure 1:
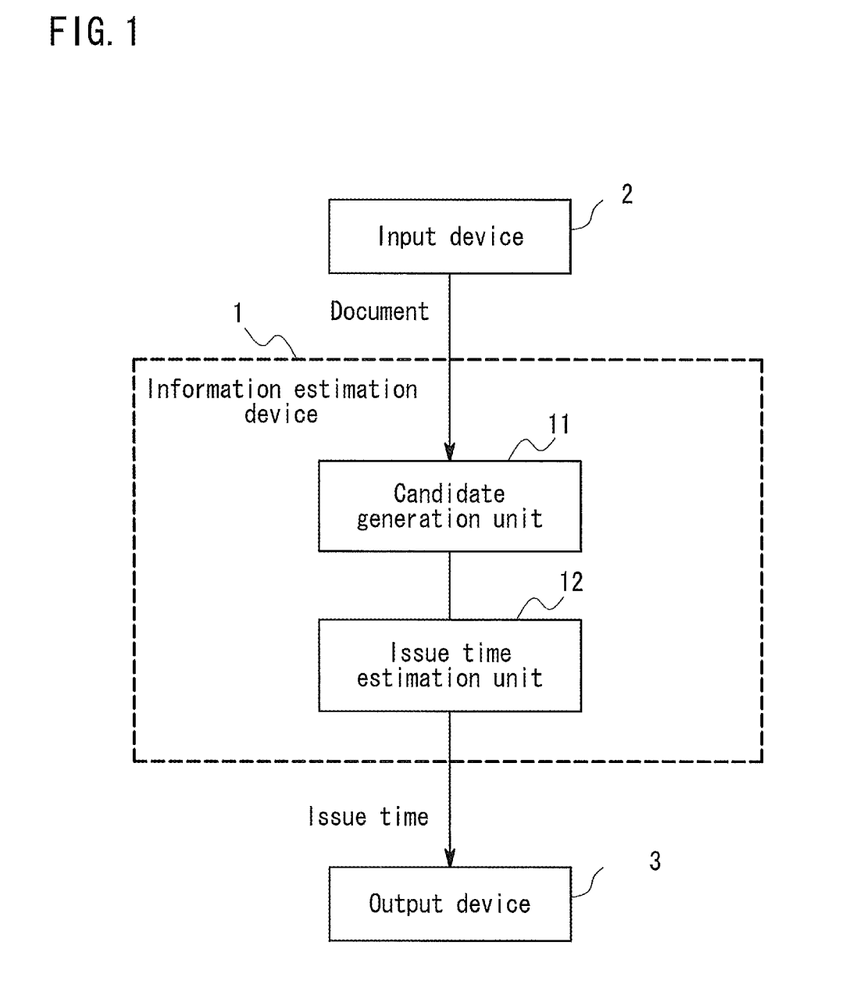
FIG. 1 is a block diagram illustrating the configuration of an information estimation device used in an embodiment of the present invention.
Figure 2:
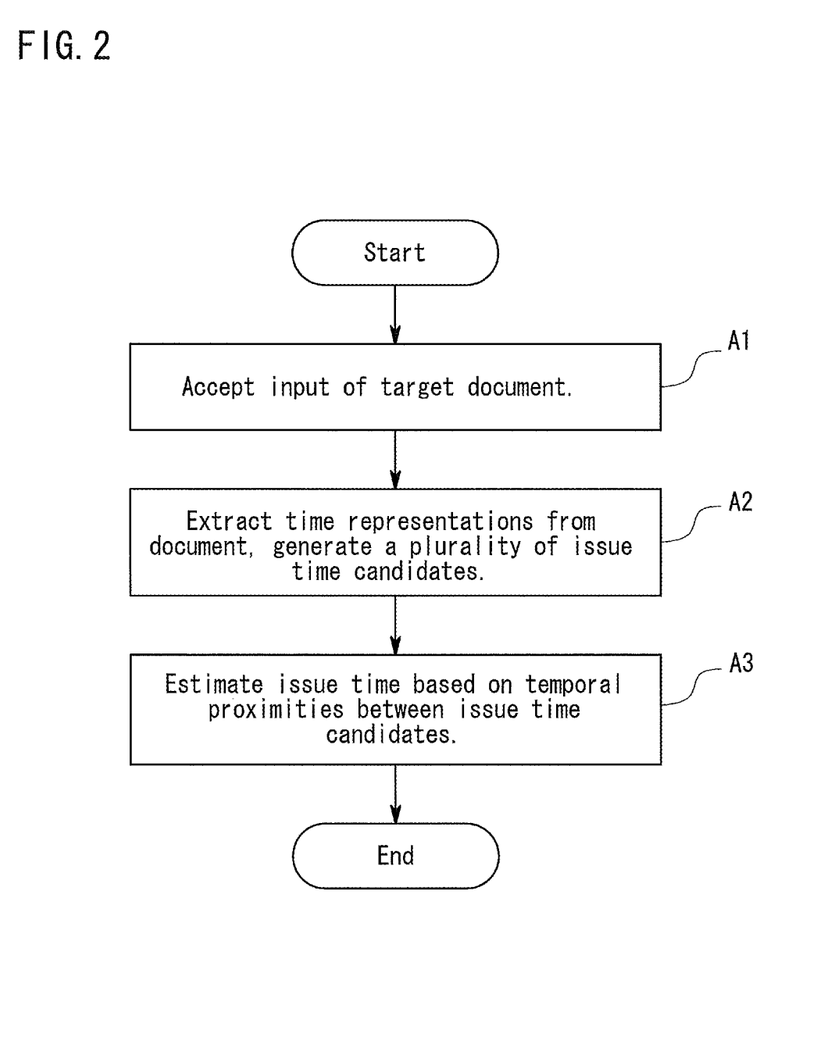
FIG. 2 is a flow chart illustrating the operation of an information estimation device used in an embodiment of the present invention.

An information estimation device, an information estimation method, and a software program used in an embodiment of the present invention will be described hereinbelow with reference to FIG. 1-FIG. 3. First of all, the configuration of the information estimation device used in the present embodiment will be described with reference to FIG. 1. FIG. 1 is a block diagram illustrating the configuration of an information estimation device used in an embodiment of the present invention. As shown in FIG. 1, the information estimation device 1 used in this embodiment is a device that estimates the time of issue of a document to be estimated (target document). A target document is inputted through an external input device 2 of an information estimation device 1. The information estimation device 1 comprises a candidate generation unit 11 and an issue time estimation unit 12.

The candidate generation unit 11 extracts time representations described in the target document and generates a plurality of issue time candidates potentially corresponding to the time of issue of the target document based on the extracted time representations. The issue time estimation unit 12 obtains temporal proximities between a given issue time candidate and other issue time candidates for each of the plurality of issue time candidates. In addition, the issue time estimation unit 12 estimates the time of issue of the target document based on the obtained temporal proximities.

In this manner, temporal proximities between the issue time candidates are obtained in the information estimation device 1. Accordingly, this permits differentiation of the issue time candidates into issue time candidates that are temporally closest to other issue time candidates and issue time candidates that are temporally farthest from other issue time candidates and makes it possible to identify issue time candidates that are very likely to correspond to the time of issue. Therefore, if the information estimation device 1 is used, the time of issue of the target document can be estimated without operator intervention and, furthermore, the estimated time of issue corresponds to the appropriate time of issue.

Here, the configuration of the information estimation device 1 used in the present embodiment will be described more specifically. First of all, in this embodiment, HTML documents published on the Internet and documents entered into databases are suggested as the target documents. In addition, in case of an HTML document published on the Internet, the time when the HTML document is published on the Internet (time of transmission) corresponds to the time of issue. Furthermore, in case of a document entered into a database, the time when the document was created and the time when it was stored in the database correspond to the time of issue.

In addition, in this embodiment, an input device 2 is connected to the information estimation device 1, with documents entered through the input device 2. Input devices directly operated by a user, such as keyboards or mice, computers interconnected via a network, storage devices, disc drive devices with recording discs having documents stored thereon, and the like, are suggested as specific examples of the input device 2.

Among the specific examples of the input device 2, memory, computers, hard disk drives (HDD: Hard Disk Drive), solid state drives (SSD: Solid State Drive), and the like are suggested as storage devices. It should be noted that, as described below, when the information estimation device 1 is implemented using a computer, the above-described storage device and disc drive device may be implemented as equipment attached to this computer. In addition, the above-described storage device and disc drive device may be connected to the information estimation device 1 via a network, and, in such a case, these devices may output documents on instructions from the candidate generation unit 11.

In this embodiment, the candidate generation unit 11 extracts time representations from the portions of documents that contain dates or times, the header information of HTML documents, document titles, URIs, texts in Web page URLs, and the like. Furthermore, time information components such as Year, Year/Month, Year/Month/Day, Month/Day, Day, or Time, as well as combinations thereof, are suggested as the extracted time representations.

In this embodiment, the issue time estimation unit 12 can obtain the above-described temporal proximities as at least one item selected from the extent of temporal overlap between each issue time candidate and other issue time candidates and the extent of temporal separation between each issue time candidate and other issue time candidates.

Specifically, first of all, the issue time estimation unit 12 identifies the minimum component with the smallest temporal granularity among the components constituting each issue time candidate and uses the period from the start to the end of the identified minimum component as the time span of each issue time candidate. The term "temporal granularity" refers to a unit used when identifying time, such as "year," "month," "day," "hour," and "second."

In addition, a plurality of types of granularity can be contemplated for the "issue time" to be estimated and the issue time estimation unit 12 can configure the granularity (minimum unit) used for identifying the minimum component to match the granularity required by the user for the "time of issue." For example, if the user wants to identify the time of issue using a combination of "year," "month," and "day," the issue time estimation unit 12 sets the minimum unit of issue time to "day." In this case the target document is believed to have been issued during a time span on the minimum unit time axis, i.e. from the start to the end of "day."

Furthermore, if the time of issue requires a time in addition to a date, the minimum unit is set to a moment in time, namely, "hour", "minute" or "second." It should be noted that in such a case the time of issue can be represented by combinations of various granularity levels, for example, a combination "year," "month," "day," and "hour", a combination of "year," "month," "day," "hour," and "minute," a combination of "year," "month," "day," "hour," "minute," and "second," and so on.

In addition, the minimum unit may be set to a granularity level shorter than "day", but other than "hour," "minute," or "second," such as, for example, "AM" and "PM", which are obtained by dividing a day into periods of 12 hours, or "morning" and "midday," and "night", which are obtained by partitioning one day into three periods. These granularity levels can be used in combination with a date to identify the time of issue on the time axis. In addition, the minimum unit may be a granularity level longer than a "day", such as second week of May, 2000 or first half of 2000, etc.

Then, the issue time estimation unit 12 can obtain the extent of temporal overlap from the degree of overlap between the respective time span of each issue time candidate and the time spans of other issue time candidates. This time, "the degree of overlap" can be obtained by determining the number of other issue time candidates possessing time spans that overlap with the time span of a certain issue time candidate. In addition, the issue time estimation unit 12 can make an estimate to the effect that the issue time candidate is the time of issue if the extent of temporal overlap is larger.

In addition, the issue time estimation unit 12 can obtain the extent of temporal separation from the temporal distances between each issue time candidate and other issue time candidates. The temporal distance can be expressed with reference to the above-described minimum unit. In addition, the issue time estimation unit 12 can make an estimate to the effect that the issue time candidate is the time of issue if the extent of temporal separation is smaller.

Furthermore, in this embodiment, the issue time estimation unit 12 can configure a reference value for the issue time candidates, and estimate the time of issue of the target document using the reference value. Examples of the reference value include values that increase as the extent of temporal overlap with other issue time candidates becomes larger, or values that increase as the extent of temporal separation from other issue time candidates becomes smaller, or combinations thereof. In addition, the issue time estimation unit 12 can make an estimate to the effect that the issue time candidate is the time of issue if the reference value of the issue time candidate is larger.

In addition, in the present embodiment, as shown in FIG. 1, the information estimation device 1 is connected to an output device 3. When the time of issue of the target document is estimated by the information estimation device 1, issue time-identifying information is sent to the output device 3. In this embodiment, the output device 3 is an information processing device such as a computer. The output device 3 performs various types of information processing using the estimated time of issue. In addition, the output device may be a display device, and, in such a case, it displays the estimated time of issue on a display screen.

Next, the operation of the information estimation device 1 used in the present embodiment will be described with reference to FIG. 2. FIG. 2 is a flow chart illustrating the operation of an information estimation device used in an embodiment of the present invention. In addition, refer to FIG. 1 as appropriate in the description that follows. Furthermore, in the present embodiment, the information estimation method is reduced into practice by operating the information estimation device 1. For this reason, the description of the information estimation method is replaced by the following description of the operation of the information estimation device 1.

Initially, as a precondition, the target document is entered into the candidate generation unit 11 via the input device 2. As a result, as shown in FIG. 2, the candidate generation unit 11 accepts input of the target document (Step A1). It is assumed that an HTML document published on the Internet is inputted in Step A1.

Next, the candidate generation unit 11 extracts time representations contained in the inputted target document and generates a plurality of issue time candidates based on the extracted time representations (Step A2). In Step A2, the time representations contained in the HTML document inputted in Step A1 are extracted. In addition, the issue time candidates generated in Step A2 are candidate times (times of transmission) when the target document was transmitted to the Internet. Furthermore, the candidate generation unit 11 also obtains the time spans of the issue time candidates.

Subsequently, for each issue time candidate generated in Step A2, the issue time estimation unit 12 obtains its temporal proximities to other issue time candidates, and estimates the time of issue of the target document based on the obtained temporal proximities (Step A3). The estimation results are transmitted to the output device 3.

In Step A3, at least one item selected from the extent of temporal overlap between the plurality of issue time candidates and the extent of temporal separation between the plurality of issue time candidates is obtained as the temporal proximity. In addition, the issue time estimation unit 12 obtains the extent of temporal overlap from the degree of overlap between the respective time span of each issue time candidate and the time spans of other issue time candidates and obtains the extent of temporal separation from the temporal distances between each issue time candidate and other issue time candidates. Upon execution of Step A3, processing in the information estimation device 1 ends.

A software program used in the present embodiment will be described next. FIG. 3 is a block diagram illustrating a computer capable of running a software program used in an embodiment of the present invention. The computer illustrated in FIG. 3 operates as an information processing device implementing the information estimation device 1.

Figure 3:
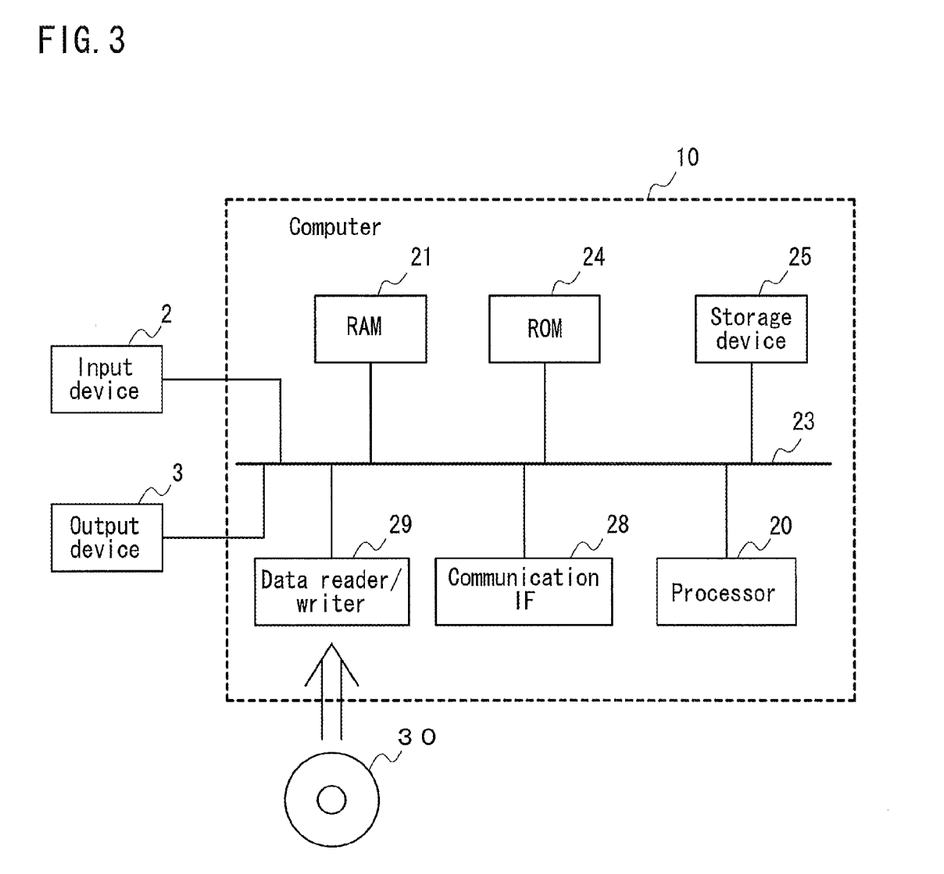
FIG. 3 is a block diagram illustrating a computer capable of running a software program used in an embodiment of the present invention.

As shown in FIG. 3, the computer 10 comprises a processor (CPU: Central Processing Unit) 20, a RAM (Random Access Memory) 21, which serves as a main memory, a bus 23, a ROM (Read Only Memory) 24, a storage device 25, a communication interface (IF) 28, and a data reader/writer 29. The bus 23 can include one or more wires that enable communication between the components of the computer 10. In addition, one, two, or more input devices 2 and one, two, or more output devices 3 are connected to the computer 10.

The software program used in this embodiment is stored in the ROM 24 or storage device 25. Said software program is then loaded by the processor 20 and deployed in the storage area of the RAM. The processor 20 operates the computer 10 based on the software program. If the software program used in this embodiment is a software program containing instructions directing the computer 10 to execute the Steps A1-A3 illustrated in FIG. 2, the processor 20 operates and performs processing as the candidate generation unit 11 and issue time estimation unit 12. As a result, the information estimation device 1 and information estimation method are implemented by the computer 10.

In addition, the software program used in this embodiment are supplied on a computer-readable storage medium 30. The software program used in this embodiment may be distributed on the Internet. The data reader/writer 29, which mediates data transmission between the processor 20 and the storage medium 30, reads the software program from the storage medium 30 and writes the processing results to the storage medium 30.

General-purpose semiconductor storage devices such as CF (Compact Flash) and SD (Secure Digital), etc., as well as magnetic storage media, such as floppy disks (Flexible Disk), or optical storage media such as CD-ROMs (Compact Disk Read Only Memory) are suggested as specific examples of the storage medium 30.

Embodiments

Next, working examples of the information estimation device 1 illustrated in the present embodiment will be described with reference to FIG. 4-FIG. 8. In this working example, the information estimation device 1 is implemented using the computer 10 illustrated in FIG. 3, and the processor 20 operates and performs processing as the candidate generation unit 11 and issue time estimation unit 12. In addition, the target document is assumed to be an HTML document published on the Internet. Furthermore, the discussion below follows the steps illustrated in FIG. 2.

Figure 4:
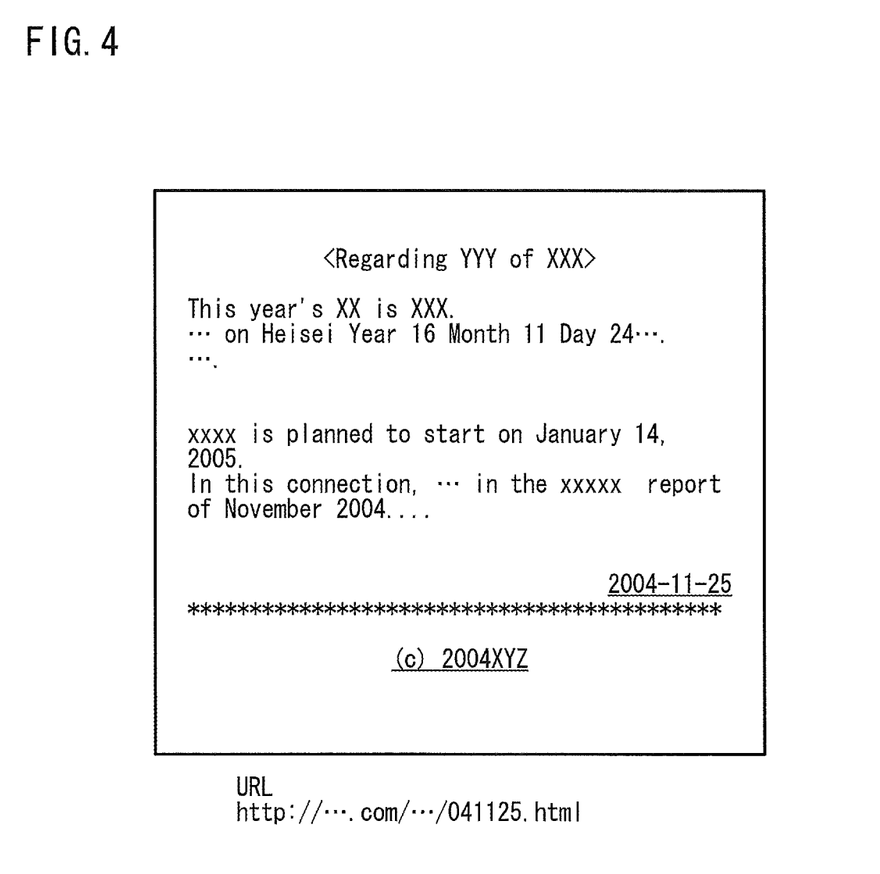
FIG. 4 is a diagram illustrating a specific example of a document to be estimated used in a working example.

[Steps A1, A2] First of all, the candidate generation unit 11 accepts a target document inputted from the input device 2 illustrated in FIG. 1 and FIG. 3. Next, the candidate generation unit 11 extracts a plurality of time representations from the inputted target document. Here, for example, it is assumed that the document illustrated in FIG. 4 is inputted as the target document. FIG. 4 is a diagram illustrating a specific example of a document to be estimated used in a working example.

The candidate generation unit 11 extracts time representations such as "Heisei Year 16 Month 11 Day 24," "Jan. 14, 2005," "2004-11-25," and "2004" from the target document illustrated in FIG. 4. The extraction of these time representations can be carried out, for example, by using regular expressions and the like representing patterns such as "*year*month*day" and "(4-digit number)-(2-digit number)-(2-digit number)". In addition, time representations represented by specific morphemic string patterns may be extracted using the results of morphological analysis of the text in the target document. Furthermore, the targeted time representations may be representations of the names of specific points in time. For example, January 1 is represented as the "New Year's Day." Extraction can be carried out using morphemic string patterns and character string patterns corresponding to specific names.

In addition, in addition to the descriptions in the body of the document, the candidate generation unit 11 can extract time representations from the text of document titles, Web page URLs, and the like. The candidate generation unit 11 can extract numerical character strings from URLs, for example, a pattern of three consecutive 2-digit numbers as a time representation designating "year," "month," and "day." Specifically, Nov. 25, 2004 is extracted as a time representation from the URL of the document illustrated in FIG. 4 based on the numeric information in "041125."

Furthermore, when a portion of the date is unclear in certain time representations, the candidate generation unit 11 can restore the unclear portion using other time representations. Time representations that appear immediately prior to a given time representation in the document, time representations whose occurrence position is close to the given time representation, i.e. within a fixed number of characters from the given time representation, etc. are suggested as the other time representations used in such a case. For example, let us assume that there is a time representation, in which the "year" is unclear and only "month" and "day" are stated. In this case, the candidate generation unit 11 can restore the "year" based on the "year" stated immediately prior to the time representation.

In addition, the candidate generation unit 11 can exclude the portion of the contents that is unrelated to the body of the document and cannot subject the time representations contained in this excluded portion to extraction. An improvement in the accuracy of estimation is expected as a result.

Next, the candidate generation unit 11 generates issue time candidates from the extracted time representations. For example, the candidate generation unit 11 can use the extracted time representations themselves as issue time candidates. In addition, the candidate generation unit 11 can identify the components of time information, such as "year," "month," "day," and "time" from specific time representation patterns and can generate issue time candidates from combinations of the identified components. Specifically, the candidate generation unit 11 can convert the Japanese calendar-based time representation "Heisei Year 16 Month 11 Day 24" to Western calendar and generate a normalized issue time candidate "Nov. 24, 2004", which is made up of the components "2004," "November," and "24".

Figure 5:
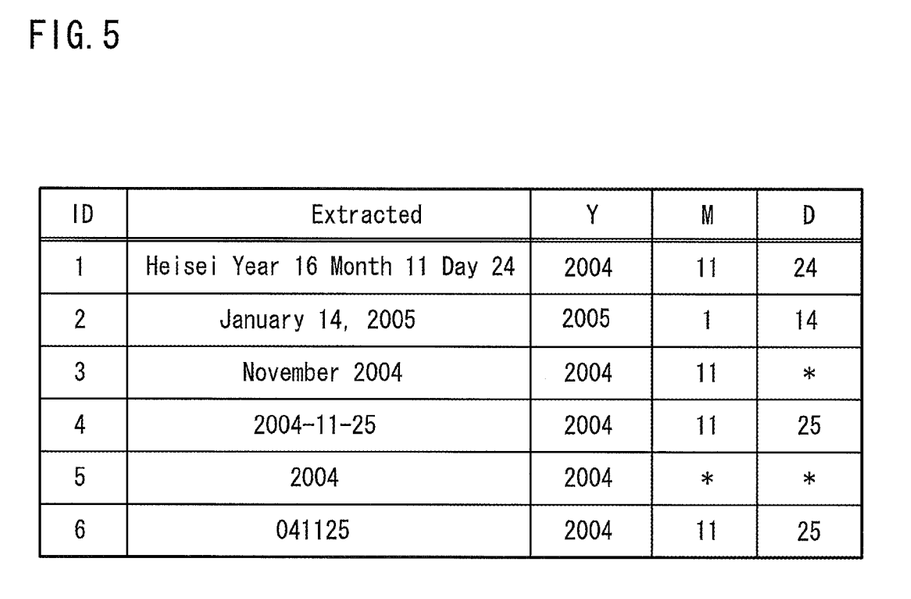
FIG. 5 is a diagram illustrating a specific example of issue time candidates generated in a working example.

In this working example, as shown in FIG. 5, the candidate generation unit 11 identifies the components constituting the extracted time representations and generates issue time candidates such that the identified components become the components of each issue time candidate. FIG. 5 is a diagram illustrating a specific example of issue time candidates generated in a working example. In the example of FIG. 5, the issue time candidates are composed of the components "year," "month," and "day." It should be noted that in FIG. 5, an ID, i.e. an identifier, is associated with each issue time candidate, and IDs are also attached to the character strings of the extracted time representations and the identified components ("year," "month," "day").

In addition, although FIG. 5 illustrates an example, in which the components of each issue time candidate are "year," "month," and "day" only, this working example is not limited to this example and may use components with finer temporal granularity, such as "hour," "minute," and "second," as well as components of other temporal granularity levels. In this case, components such as "hour" and "minute" are inserted in additional new columns in the table illustrated in FIG. 5.

[Step A3] Subsequently, for each of the plurality of issue time candidates generated by the candidate generation unit 11, the issue time estimation unit 12 obtains its temporal proximities to the issue time candidates, and estimates the time of issue of the target document based on the obtained temporal proximities. In this working example, the extent of temporal overlap between each issue time candidate and other issue time candidates and the extent of temporal separation between each issue time candidate and other issue time candidates are obtained as temporal proximities.

In addition, in this working example, the extent of temporal overlap between each issue time candidate and other issue time candidates is calculated based on the strength of overlap of the time spans denoted by the issue time candidates, namely, based on the degree of overlap between the time span of each issue time candidate and the time spans of other issue time candidates. Accordingly, first of all, the issue time estimation unit 12 identifies the time spans of the issue time candidates.

For example, if we assume that a group (combination of components) comprising "year," "month," and "day" is identified in an issue time candidate, then the time span will be a period from the start to the end of the minimum component, i.e. "day." Similarly, in the case of an issue time candidate identified by a group comprising "year" and "month," the time span will be a period from the start to the end of the "month." Furthermore, in the case of an issue time candidate identified only as "year," the time span will be a period from the start to the end of the "year"

In addition, the issue time estimation unit 12 can configure the granularity (minimum unit) used to identify the minimum component so as to match the granularity level required by the user for the "time of issue" and can perform the identification of the minimum component and the identification of the time spans based on the configured granularity. For example, if "year" has been configured as the minimum unit, the issue time estimation unit 12 consistently identifies a period from the start to the end of the "year" of each issue time candidate as the time span. Similarly, if "month" has been configured as the minimum unit, the issue time estimation unit 12 consistently identifies a period from the start to the end of the "month" of each issue time candidate as the time span.

In addition, the issue time estimation unit 12 can compare the time span of one issue time candidate with other issue time candidates, obtain the number of other issue time candidates having time spans overlapping with the time span of the issue time candidate and, based on this number, acquire the level of overlap between time spans. Furthermore, the issue time estimation unit 12 can weight the obtained number of issue time candidates and acquire the level of overlap between the time spans based on the resultant value.

Figure 6:
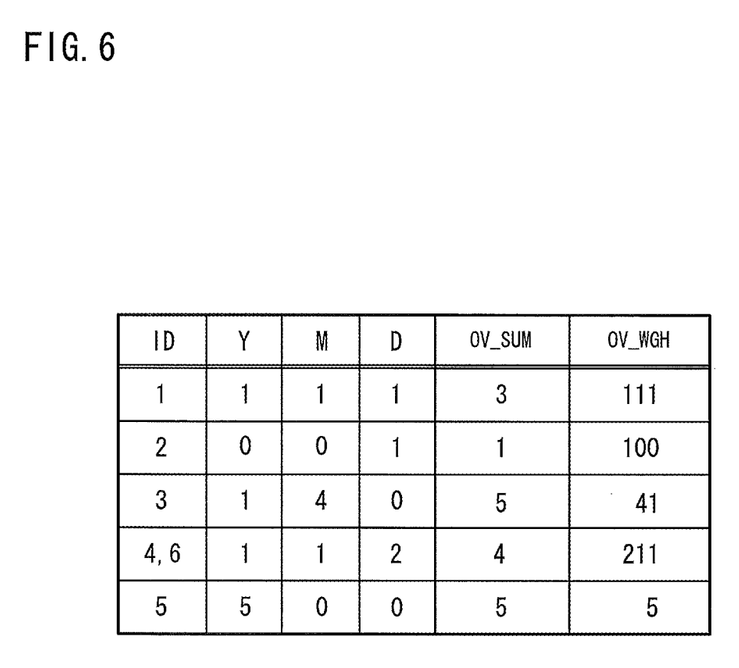
FIG. 6 is a diagram illustrating a specific example of the extent of overlap between issue time candidates obtained in a working example.

FIG. 6 is a diagram illustrating a specific example of the extent of overlap between issue time candidates obtained in a working example. In the example of FIG. 6, a common extent of overlap is obtained for issue time candidates with identical issue times (see ID=4,6). In addition, the number of other issue time candidates with overlapping time spans is obtained for each issue time candidate as the extent of overlap. It should be noted that in the example of FIG. 6, the number of issue time candidates is obtained for each granularity level of the time span overlapping with other issue time candidates, in other words, for "year," "month," and "day."

To explain, let us use the issue time candidate with an Id of "1" (time representation: Nov. 24, 2004) as an example. Since there are no issue time candidates with the same issue time as ID "1," it is not combined. Then, since the time span of ID "1" overlaps with the time span of ID "5" and its granularity level is "year", one "Year:Y" overlap is obtained. In addition, since the time span of ID "1" overlaps with the time span of ID "3" and its granularity level is "month", one "Month: M" overlap is obtained.

Furthermore, in the example of FIG. 6, in addition to the overlaps between ID "1" and other IDs, the overlap of ID "1" with itself is also added as a number. In other words, since the time span of ID "1" overlaps with the time span of ID "1" itself and its granularity level is "day", one "Day:D" overlap is obtained.

In addition, as shown in FIG. 6, the issue time estimation unit 12 computes the total number of the obtained overlaps for each granularity level for each issue time candidate. In FIG. 6, the column "OV_SUM" shows, for each issue time candidate, the total number of issue time candidates whose time spans overlap with the issue time candidate. "OV_SUM" shows the above-mentioned "extent of temporal overlap between each issue time candidate and other issue time candidates." Specifically, in the case of ID "1," the value in the "OV_SUM"

column is 3 because there is one "Year:Y" overlap, one "Month:M" overlap, and one "Day:D" overlap.

As described above, in the example of FIG. 6, ID "4" and ID "6" are combined because their time of issue is the same, i.e. "Nov. 25, 2004". Additionally, since the time span of IDs "4" "6" overlaps with the time span of ID "5" and its granularity level is "year," one "Year:Y" overlap is obtained. Also, since the time span of ID "4" "6" overlaps with the time span of ID "3" and its granularity level is "month", one "Month:M" overlap is obtained. Further, since the time span of ID "4" "6" overlaps with the time span of ID "4" itself and ID "6" itself and its granularity level is "day", two "Day:D" overlaps are obtained. As a result, the total, as shown in the "OV_SUM" column of FIG. 6, is "4." It should be noted that numbers for other IDs are obtained in the same manner.

In addition, in this working example, a value obtained by weighting the number of issue time candidates with overlapping time spans can also be used as a measure indicating the "extent of temporal overlap between each issue time candidate and other issue time candidates." In the example of FIG. 6, "OV_WGH" corresponds to the weighted values. In this working example, "OV_WGH" can be calculated from the following (Eq. 1).

$$OV\_WGH(T) = \alpha Y \times FY(T) + \alpha M \times FM(T) + \alpha D \times FD(T) \quad (Eq.\ 1)$$

In (Eq. 1) above 'T' designates the ID of an issue time candidate. OV_WGH (T), which is a measure indicating the extent of temporal overlap with other issue time candidates for each issue time candidate, is calculated by changing the weighting for each granularity level. In (Eq. 1) above, the function FY(T) shows the number of overlaps for "years", the function FM(T) shows the number of overlaps for "months," and the function FD(T) shows the number of overlaps for "days." In addition, $\alpha Y$ is a weighting factor set for FY(T), $\alpha M$ is a weighting factor set for FM(T), and $\alpha D$ is a weighting factor set for FD(T).

In general, the association between two issue time candidates present in the same document tends to become stronger when the two overlap within a narrow time span and tends to become weaker when they overlap within a wide time span. For this reason, it is preferable to configure $\alpha Y$ to be smaller than $\alpha M$, and $\alpha M$ to be smaller than $\alpha D$. For example, in the example of FIG. 6, the "OV_WGH" column is calculated by setting $\alpha Y=1$, $\alpha M=10$ and $\alpha D=100$.

In addition, in this working example, the extent of temporal separation between each issue time candidate and other issue time candidates is calculated from the intervals between the time denoted by the issue time candidates, namely, from the temporal distances between each issue time candidate and other issue time candidates. In these calculations, a specific point in time, such as a point in time at the start of the time period denoted by the issue time candidate, an intermediate point, or an end point, are used as the time denoted by each issue time candidate, in other words, the point in time used as a basis for calculation.

For example, in the case of "Jan. 14, 2005," the start of that day can be used as the time denoted by the issue time candidate. The granularity of this time may be set to the smallest unit, such as "second," "minute," and the like. For example if the minimum unit is set to "minute", the time denoted by "Jan. 14, 2005" is a time identified as a "minute" at the start of that day, namely, "01-14-2005 00:00 AM."

In addition, the "intervals between the time denoted by the issue time candidates" are calculated, for example, by comparing the moments in time denoted by the issue time candidates and obtaining, for each issue time candidate, temporal distances between the issue time candidate and other issue time candidates. The temporal distances are expressed with reference to "year," "month," or "day," etc. In addition, the obtained temporal distances are added up for each issue time candidate used as a distance reference, with a total or average value corresponding to the above-mentioned "extent of temporal separation."

Figure 7:
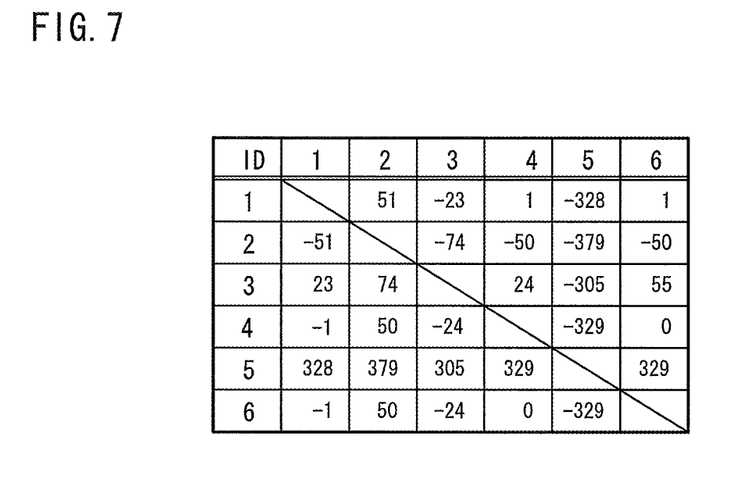
FIG. 7 is a diagram illustrating a specific example of temporal distances between issue time candidates obtained in a working example.

FIG. 7 is a diagram illustrating a specific example of temporal distances between issue time candidates obtained in a working example. In the example of FIG. 7, the temporal distances are obtained with reference to "day" or "24 hours" as a reference unit. In addition, for each issue time candidate, temporal distances between the issue time candidate and other issue time candidates is calculated as shown in FIG. 7. Specifically, provided that the issue time candidate of each row is used as a reference point in the row, the diagram shows the magnitude of the distance between it and the issue time candidate of each column. Furthermore, in FIG. 7, when the distance value is positive, it means that there is a gap corresponding to the absolute value of this value that faces towards the future, and when the distance value is negative, it means that it faces towards the past.

Figure 8:
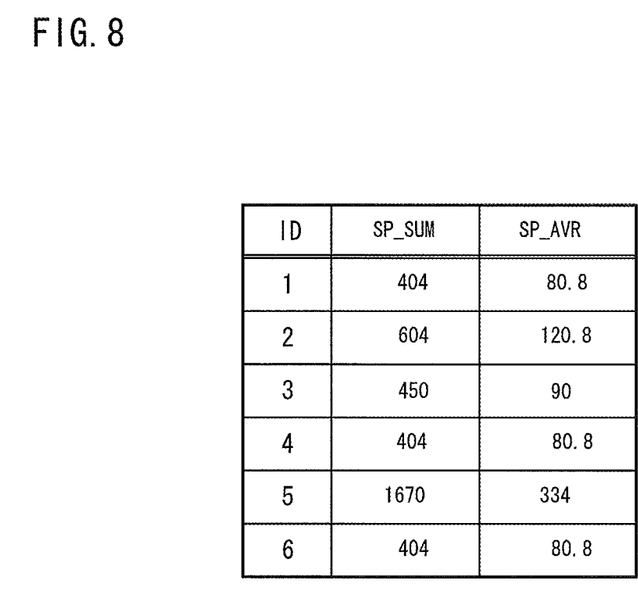
FIG. 8 is a diagram illustrating a specific example of the extent of temporal separation between issue time candidates obtained in a working example.

Further, an example of the "extent of temporal separation," calculated using the temporal distances illustrated in FIG. 7, is shown in FIG. 8. FIG. 8 is a diagram illustrating a specific example of the extent of temporal separation between issue time candidates obtained in a working example. In FIG. 8, the "SP_SUM" column shows a total of the absolute values of the temporal distances between each issue time candidate and other issue time candidates. In addition, in FIG. 8, the "SP_AVR" shows an average of the absolute values of the temporal distances between each issue time candidate and other issue time candidates. "SP_SUM" and "SP_AVR" correspond to the above-described "extent of temporal separation." Either one of them is used in estimating the time of issue.

Finally, the issue time estimation unit 12 selects appropriate time of issue candidates based on at least one item selected from the extent of temporal overlap between the plurality of issue time candidates and the extent of temporal separation between the plurality of issue time candidates and makes an estimate to the effect that the time of issue indicated thereby is the time of issue of the target document. Specifically, in this working example, a reference value is configured for each issue time candidate that represents the likelihood of it being the time of issue, the most appropriate time of issue candidate is selected using the reference value, and this time of issue is presumed to be the time of issue of the target document. For example, the issue time estimation unit 12 can make an estimate to the effect that an issue time candidate whose issue time candidate reference value is larger is the time of issue. In addition, the issue time estimation unit 12 can be used in order to exclude issue time candidates whose issue time candidate reference value is smaller.

Examples of the reference value include values that increase as the extent of temporal overlap with other issue time candidates becomes larger, or values that increase as the extent of temporal separation from other issue time candidates becomes smaller, or combinations thereof. For example, the reference value may be either the extent of temporal overlap between the plurality of issue time candidates or the extent of temporal separation between the plurality of issue time candidates. In addition, the reference value may be a ranking used when sorting the issue time candidates in the order of increasing extent of temporal overlap or a ranking used when sorting the issue time candidates in the order of decreasing extent of temporal separation.

Furthermore, in this working example, the extent of temporal overlap between the plurality of issue time candidates and the extent of temporal separation between the plurality of issue time candidates can be assigned weights, calculations can be carried out using the extents and the weights, and the computed values can be added up, with the resultant value used as a reference value. Specifically, a reference value Z(T) can be obtained from the following (Eq. 2). In (Eq. 2) below, 'T' designates the ID of a target issue time candidate.

$$Z(T) = \beta \times OV(T)/OV\_MAX + \gamma \times 1/(SP(T)/SP\_MAX) \quad (Eq. 2)$$

In (Eq. 2) above, "OV(T)" designates the value of the extent of temporal overlap of an issue time candidate with an ID of 'T' with other issue time candidates (OV_SUM or OV_WGH: see FIG. 3), and "OV_MAX" designates the maximum value of temporal overlap "OV(T)" among the plurality of issue time candidates. In addition, "SP(T)" designates the value of the extent of temporal separation of an issue time candidate with an ID of 'T' from other issue time candidates (see FIG. 8), and "SP_MAX" designates the maximum value of temporal separation "SP(T)" among the plurality of issue time candidates.

In addition, in (Eq. 2) above, "beta" is a weighting factor used for the extent of temporal overlap and "gamma" is a weighting factor used for the extent of temporal separation. Usually, "1" is used for both "beta" and "gamma," but other values may also be used.

In addition, in this working example, another value may be added to the reference value obtained from (Eq. 2) above and the resultant value may be used as a reference value. For example, when a specific character string is present in the text surrounding each issue time candidate, addition or subtraction may be performed on the above-described reference value.

The issue time estimation unit 12 then identifies a reference value with the largest value based on the reference values of the obtained issue time candidates and makes an estimate to the effect that the issue time candidate that has this reference value is the time of issue of the document. In addition, the issue time estimation unit 12 sends information that identifies the time of issue to the output device 3.

Furthermore, in this working example, the reference value obtained from (Eq. 2) above is used as one of the features, and it is possible to use a transmission date estimation rule or an estimation learning machine that combines it with other features. Character strings that surround time representations serving as the source of the issue time candidates in the documents, the positions of appearance of the time representations serving as the source of the issue time candidates in the documents, etc., are suggested as examples of the other features. A rule, in accordance with which the target issue time candidate is estimated to be the time of issue of the document when the reference value is equal to, or higher than, a fixed value and, at the same time, the characters "Published" are present before and after the time representation serving as the source of the target issue time candidate, is suggested as a specific example of the above-mentioned estimation rule.

As described above, in accordance with the present embodiment, issue time candidates that are extremely likely to correspond to the time of issue, such as time candidates that are temporally closest to other issue time candidates and issue time candidates that are temporally farthest from other issue time candidates, are identified among the issue time candidates. In addition, since such information is useful in the identification of actual time of issue, in this working example, the estimated time of issue it assumed to be the appropriate time of issue.

In addition, while some or all of the above-described embodiments and working examples can be expressed in the form of the following (Supplementary Note 1)-(Supplementary Note 21), they are not limited to the descriptions below.
(Supplementary Note 1)

An information estimation device that estimates the time of issue of a document to be estimated, comprising:

a candidate generation unit that extracts time representations described in the document to be estimated, and generates a plurality of issue time candidates potentially corresponding to the time of issue of the document to be estimated based on the extracted time representations; and an issue time estimation unit that obtains temporal proximities between a given issue time candidate and other issue time candidates for each of the plurality of issue time candidates, and estimates the time of issue of the document to be estimated based on the obtained temporal proximities.
(Supplementary Note 2)

The information estimation device according to Supplementary Note 1, wherein the issue time estimation unit obtains, as the temporal proximity, at least either one of the extent of temporal overlap between a given issue time candidate and other issue time candidates and the extent of temporal separation between a given issue time candidate and other issue time candidates.
(Supplementary Note 3)

The information estimation device according to Supplementary Note 2, wherein the issue time estimation unit, for each of the plurality of issue time candidates, identifies a minimum component with the smallest temporal granularity among the components constituting a given issue time candidate, uses a period from the start to the end of the identified minimum component as the time span of the issue time candidate, and obtains the extent of temporal overlap from the degree of overlap between the time span of the issue time candidate and the time spans of other issue time candidates.
(Supplementary Note 4)

The information estimation device according to Supplementary Note 3, wherein the issue time estimation unit further obtains, as the degree of overlap, the number of other issue time candidates whose time spans overlap with the time span of a given issue time candidate and obtains the extent of temporal overlap based on the obtained number.
(Supplementary Note 5)

The information estimation device according to Supplementary Notes 2-4, wherein the issue time estimation unit configures a first reference value whose value increases as the extent of temporal overlap becomes larger for each of the plurality of issue time candidates, and estimates the time of issue of the document to be estimated using the first reference value.
(Supplementary Note 6)

The information estimation device according to any one of Supplementary Notes 2-5, wherein the issue time estimation unit obtains the extent of temporal separation from temporal distances between a given issue time candidate and other issue time candidates.
(Supplementary Note 7)

The information estimation device according to Supplementary Notes 2-6, wherein the issue time estimation unit configures a second reference value whose value increases as the extent of temporal separation becomes smaller for each of the plurality of issue time candidates, and estimates the time of issue of the document to be estimated using the second reference value.

(Supplementary Note 8)

An information estimation method for estimating the time of issue of a document to be estimated, comprising the steps of:

(a) extracting time representations described in the document to be estimated, and generating a plurality of issue time candidates potentially corresponding to the time of issue of the document to be estimated based on the extracted time representations; and (b) obtaining temporal proximities between a given issue time candidate and other issue time candidates for each of the plurality of issue time candidates, and estimating the time of issue of the document to be estimated based on the obtained temporal proximities.

(Supplementary Note 9)

The information estimation method according to Supplementary Note 8 above, wherein in Step (b), as the temporal proximity, at least either one of the extent of temporal overlap between a given issue time candidate and other issue time candidates and the extent of temporal separation between a given issue time candidate and other issue time candidates is obtained.

(Supplementary Note 10)

The information estimation method according to Supplementary Note 9 above, wherein in Step (b), for each of the plurality of issue time candidates, a minimum component with the smallest temporal granularity is identified among the components constituting a given issue time candidate, and using a period from the start to the end of the identified minimum component as the time span of the issue time candidate, the extent of temporal overlap is obtained from the degree of overlap between the time span of the issue time candidate and the time spans of other issue time candidates.

(Supplementary Note 11)

The information estimation method according to Supplementary Note 10 above, wherein in Step (b), further, as the degree of overlap, the number of other issue time candidates whose time spans overlap with the time span of a given issue time candidate is obtained, and the extent of temporal overlap is obtained based on the obtained number.

(Supplementary Note 12)

The information estimation method according to Supplementary Notes 9-11 above, wherein in Step (b), a first reference value is configured whose value increases as the extent of temporal overlap becomes larger for each of the plurality of issue time candidates, and the time of issue of the document to be estimated is estimated using the first reference value.

(Supplementary Note 13)

The information estimation method according to any one of Supplementary Notes 9-12, wherein in Step (b), the extent of temporal separation is obtained from temporal distances between a given issue time candidate and other issue time candidates.

(Supplementary Note 14)

The information estimation method according to Supplementary Notes 9-13 above, wherein in Step (b), a second reference value is configured whose value increases as the extent of temporal separation becomes smaller for each of the plurality of issue time candidates, and the time of issue of the document to be estimated is estimated using the second reference value.

(Supplementary Note 15)

A computer-readable storage medium having recorded thereon a software program for estimating the time of issue of a document to be estimated using a computer, the software program comprising instructions directing a computer to execute the steps of (a) extracting time representations described in the document to be estimated, and generating a plurality of issue time candidates potentially corresponding to the time of issue of the document to be estimated based on the extracted time representations; and (b) obtaining temporal proximities between a given issue time candidate and other issue time candidates for each of the plurality of issue time candidates, and estimating the time of issue of the document to be estimated based on the obtained temporal proximities.

(Supplementary Note 16)

The computer-readable storage medium according to Supplementary Note 15 above, wherein in Step (b), as the temporal proximity, at least either one of the extent of temporal overlap between a given issue time candidate and other issue time candidates and the extent of temporal separation between a given issue time candidate and other issue time candidates is obtained.

(Supplementary Note 17)

The computer-readable storage medium according to Supplementary Note 16 above, wherein in Step (b), for each of the plurality of issue time candidates, a minimum component with the smallest temporal granularity is identified among the components constituting a given issue time candidate, and using a period from the start to the end of the identified minimum component as the time span of the issue time candidate, the extent of temporal overlap is obtained from the degree of overlap between the time span of the issue time candidate and the time spans of other issue time candidates.

(Supplementary Note 18)

The computer-readable storage medium according to Supplementary Note 17 above, wherein in Step (b), further, as the degree of overlap, the number of other issue time candidates whose time spans overlap with the time span of a given issue time candidate is obtained, and the extent of temporal overlap is obtained based on the obtained number.

(Supplementary Note 19)

The computer-readable storage medium according to Supplementary Notes 16-18 above, wherein in Step (b), a first reference value is configured whose value increases as the extent of temporal overlap becomes larger for each of the plurality of issue time candidates, and the time of issue of the document to be estimated is estimated using the first reference value.

(Supplementary Note 20)

The computer-readable storage medium according to any one of Supplementary Notes 16-19, wherein in Step (b), the extent of temporal separation is obtained from temporal distances between a given issue time candidate and other issue time candidates.

(Supplementary Note 21)

The computer-readable storage medium according to Supplementary Notes 16-20 above, wherein in Step (b), a second reference value is configured whose value increases as the extent of temporal separation becomes smaller for each of the plurality of issue time candidates, and the time of issue of the document to be estimated is estimated using the second reference value.

While the invention of the present application has been described above with reference to embodiments and working examples, the invention of the present application is not limited to the above-described embodiments and working examples. Various changes in the form and details of the invention of the present application, which can be appreciated by those of ordinary skill in the art, can be made within the scope of the invention of the present application.

This application claims the benefit of priority from Japanese Patent Application 2009-288563 filed on Dec. 21, 2009, the disclosure of which is incorporated herein by reference in its entirety.

INDUSTRIAL APPLICABILITY

The present invention is useful for devices uses to associate a time of issue with a document on the Internet or Intranet, devices associating a time of issue with a document and creating a search index for that document, devices associating a time of issue with collected Web pages, web archive systems, and the like.

In addition, the present invention is useful in issue time estimation systems that return issue time estimation results for Web pages specifies by a URL through a network, as well as RSS data delivery systems that estimate the time of issue and use the estimated time of issue, etc. In addition, the present invention is useful in Web browsers having the capability to display the time of issue of the viewed web pages, in document analysis systems using the time of issue, etc.

DESCRIPTIONS OF REFERENCE NUMERALS

1 Information estimation device
2 Input device
3 Output device
10 Computer
11 Candidate generation unit
12 Issue time estimation unit
20 Processor
21 RAM
22 Bus
24 ROM
25 Storage device
28 Communication interface
29 Data reader/writer
30 Storage medium

The invention claimed is:

1. An information estimation device that estimates the time of issue of a document to be estimated, comprising:
 a processor;
 a candidate generation unit that extracts time representations described in the document to be estimated, and generates a plurality of issue time candidates potentially corresponding to the time of issue of the document to be estimated based on the extracted time representations; and
 an issue time estimation unit that obtains temporal proximities between a given issue time candidate and other issue time candidates for each of the plurality of issue time candidates, and estimates the time of issue of the document to be estimated based on the obtained temporal proximities.

2. The information estimation device according to claim 1, wherein the issue time estimation unit obtains, as the temporal proximity, at least either one of the extent of temporal overlap between a given issue time candidate and other issue time candidates and the extent of temporal separation between a given issue time candidate and other issue time candidates.

3. The information estimation device according to claim 2, wherein the issue time estimation unit, for each of the plurality of issue time candidates, identifies a minimum component with the smallest temporal granularity among the components constituting a given issue time candidate, uses a period from the start to the end of the identified minimum component as the time span of the issue time candidate, and obtains the extent of temporal overlap from the degree of overlap between the time span of the issue time candidate and the time spans of other issue time candidates.

4. The information estimation device according to claim 3, wherein the issue time estimation unit further obtains, as the degree of overlap, the number of other issue time candidates whose time spans overlap with the time span of a given issue time candidate and obtains the extent of temporal overlap based on the obtained number.

5. The information estimation device according to claim 2, wherein the issue time estimation unit configures a first reference value whose value increases as the extent of temporal overlap becomes larger for each of the plurality of issue time candidates, and estimates the time of issue of the document to be estimated using the first reference value.

6. The information estimation device according to claim 2, wherein the issue time estimation unit obtains the extent of temporal separation from temporal distances between a given issue time candidate and other issue time candidates.

7. The information estimation device according to claim 2, wherein the issue time estimation unit configures a second reference value whose value increases as the extent of temporal separation becomes smaller for each of the plurality of issue time candidates, and estimates the time of issue of the document to be estimated using the second reference value.

8. An information estimation method for estimating the time of issue of a document to be estimated, comprising the steps of:
 (a) extracting time representations described in the document to be estimated, and generating a plurality of issue time candidates potentially corresponding to the time of issue of the document to be estimated based on the extracted time representations; and
 (b) obtaining temporal proximities between a given issue time candidate and other issue time candidates for each of the plurality of issue time candidates, and estimating the time of issue of the document to be estimated based on the obtained temporal proximities.

9. A non-transitory computer-readable storage medium having recorded thereon a software program for estimating the time of issue of a document to be estimated using a computer, the software program comprising instructions directing a computer to execute the steps of:
 (a) extracting time representations described in the document to be estimated, and generating a plurality of issue time candidates potentially corresponding to the time of issue of the document to be estimated based on the extracted time representations; and
 (b) obtaining temporal proximities between a given issue time candidate and other issue time candidates for each of the plurality of issue time candidates, and estimating the time of issue of the document to be estimated based on the obtained temporal proximities.

10. The information estimation method according to claim 8, wherein in Step (b), as the temporal proximity, at least either one of the extent of temporal overlap between a given issue time candidate and other issue time candidates and the extent of temporal separation between a given issue time candidate and other issue time candidates is obtained.

11. The information estimation method according to claim 10, wherein in Step (b), for each of the plurality of issue time candidates, a minimum component with the smallest temporal granularity is identified among the components constituting a given issue time candidate, and using a period from the start to the end of the identified minimum component as the time span of the issue time candidate, the extent of temporal overlap is obtained from the degree of overlap between the time span of the issue time candidate and the time spans of other issue time candidates.

12. The information estimation method according to claim 11, wherein in Step (b), further, as the degree of overlap, the number of other issue time candidates whose time spans overlap with the time span of a given issue time candidate is obtained, and the extent of temporal overlap is obtained based on the obtained number.

13. The information estimation method according to claim 10, wherein in Step (b), a first reference value is configured whose value increases as the extent of temporal overlap becomes larger for each of the plurality of issue time candidates, and the time of issue of the document to be estimated is estimated using the first reference value.

14. The information estimation method according to claim 10, wherein in Step (b), the extent of temporal separation is obtained from temporal distances between a given issue time candidate and other issue time candidates.

15. The information estimation method according to claim 10, wherein in Step (b), a second reference value is configured whose value increases as the extent of temporal separation becomes smaller for each of the plurality of issue time candidates, and the time of issue of the document to be estimated is estimated using the second reference value.

16. The computer-readable storage medium according to claim 9, wherein in Step (b), as the temporal proximity, at least either one of the extent of temporal overlap between a given issue time candidate and other issue time candidates and the extent of temporal separation between a given issue time candidate and other issue time candidates is obtained.

17. The computer-readable storage medium according to claim 16, wherein in Step (b), for each of the plurality of issue time candidates, a minimum component with the smallest temporal granularity is identified among the components constituting a given issue time candidate, and using a period from the start to the end of the identified minimum component as the time span of the issue time candidate, the extent of temporal overlap is obtained from the degree of overlap between the time span of the issue time candidate and the time spans of other issue time candidates.

18. The computer-readable storage medium according to claim 17, wherein in Step (b), further, as the degree of overlap, the number of other issue time candidates whose time spans overlap with the time span of a given issue time candidate is obtained, and the extent of temporal overlap is obtained based on the obtained number.

19. The computer-readable storage medium according to claim 16, wherein in Step (b), a first reference value is configured whose value increases as the extent of temporal overlap becomes larger for each of the plurality of issue time candidates, and the time of issue of the document to be estimated is estimated using the first reference value.

20. The computer-readable storage medium according to claim 16, wherein in Step (b), the extent of temporal separation is obtained from temporal distances between a given issue time candidate and other issue time candidates.

21. The computer-readable storage medium according to claim 16, wherein in Step (b), a second reference value is configured whose value increases as the extent of temporal separation becomes smaller for each of the plurality of issue time candidates, and the time of issue of the document to be estimated is estimated using the second reference value.

* * * * *